United States Patent
Sano et al.

(10) Patent No.: US 6,356,037 B1
(45) Date of Patent: Mar. 12, 2002

(54) DIELECTRIC CERAMIC AND A CAPACITOR USING THE SAME

(75) Inventors: Harunobu Sano, Kyoto; Kazuhiro Harada, Shiga-ken; Osamu Yamaoka, Shimane-ken; Shinichi Kobayashi, Izumo; Toshiya Esumi, Hirata; Yoshitaka Kageyama, Izumo, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/287,710

(22) Filed: Apr. 7, 1999

(30) Foreign Application Priority Data

Apr. 8, 1998 (JP) .............................. 10-096162

(51) Int. Cl.⁷ .............................................. H05B 37/00
(52) U.S. Cl. .................. 315/241 R; 361/320; 361/321.1
(58) Field of Search .................. 315/241 R; 361/320, 361/321.1, 321.2, 321.3, 321.4, 321.5, 524

(56) References Cited

U.S. PATENT DOCUMENTS

| | | | |
|---|---|---|---|
| 4,405,478 A | * 9/1983 | Murase et al. ............. 252/62.3 |
| 4,520,294 A | * 5/1985 | Iida et al. ..................... 315/50 |
| 4,999,736 A | * 3/1991 | Kishi et al. .................. 361/321 |
| 5,014,158 A | * 5/1991 | Nishimura et al. .......... 361/321 |
| 5,051,864 A | * 9/1991 | Chazono et al. ............. 361/321 |
| 5,059,566 A | * 10/1991 | Kanal et al. ................. 501/138 |
| 5,453,907 A | * 9/1995 | Kim et al. ................ 361/321.1 |
| 5,504,044 A | * 4/1996 | Okawa et al. ................... 501/1 |
| 5,556,585 A | * 9/1996 | Yano et al. .................... 264/56 |

FOREIGN PATENT DOCUMENTS

| | | |
|---|---|---|
| JP | 60-52006 | 3/1985 |
| JP | 63-221504 | 9/1988 |
| JP | 63-221505 | 9/1988 |
| JP | 1-136323 | 5/1989 |
| JP | 1-136324 | 5/1989 |
| JP | 4-34832 | 2/1992 |

* cited by examiner

*Primary Examiner*—Tho Phan
*Assistant Examiner*—Trinh Vo Dinh
(74) *Attorney, Agent, or Firm*—Ostrolenk, Faber, Gerb & Soffen, LLP (57) ABSTRACT

An inexpensive capacitor for pulse generation whose characteristics do not deteriorate even when the capacitor is used in a high temperature, high vacuum, reducing atmosphere, and which enables generation of high-voltage pulses over a wide temperature range. The dielectric body 1 of the capacitor is constructed of a non-linear dielectric ceramic which exhibits resistance to reduction. The non-linear dielectric ceramic comprises a polycrystalline substance containing barium titanate as a primary component, and when the polycrystalline substance is represented by $(1-a-b)ABO_3 + aM + bR$ wherein $ABO_3$ is a barium titanate component and represents a perovskite structure, M is an oxide of at least one element selected from the group consisting of Mn, Ni and Co, R is an oxide of at least one element selected from the group consisting of La, Ce, Nd, Pr, Sm, Eu, Gd, Tb, Dy, Ho, Er and Yb, and a and b represent mole fractions; A, B, a, and b satisfy the following relationships: $1.000 \leq A/B \leq 1.006$ (mole ratio), $0.3 \leq b/a \leq 3$, $0.0015 \leq a \leq 0.0050$, and $0.0015 \leq b \leq 0.0050$, and a total content of M and R represented by Ad satisfies $0.3 < Ad \leq 1.0$ (wt. %).

15 Claims, 4 Drawing Sheets

DIELECTRIC CERAMIC AND A CAPACITOR USING THE SAME

BACKGROUND OF THE INVENTION

1. Field of the Invention

The present invention relates to a dielectric ceramic and a capacitor using the same. More particularly, the present invention relates to a pulse-generating capacitor which is used as a starter of a discharge lamp, inter alia, a high-pressure vapor discharge lamp which houses a starter inside an outer bulb of the lamp.

2. Background Art

An ordinary commercial power supply is insufficient for starting a high-pressure vapor discharge lamp such as a high-pressure sodium lamp, and therefore, a high voltage pulse must be applied to the lamp. There has come into wide use a high-pressure vapor discharge lamp in which a starter for generating a high voltage pulse is built into an outer bulb and which is used in combination with a ballast for ordinary high-pressure mercury lamps. Such a high-pressure vapor discharge lamp has a basic structure such that a capacitor formed from a non-linear dielectric ceramic is connected in parallel to an arc tube, into which a semiconductor switch (SSS) is incorporated in order to generate a high voltage pulse. The thus generated high voltage pulse is applied to the arc tube together with a power source voltage in order to start the discharge lamp.

As a capacitor serving as means for stably generating such a high voltage pulse, a non-linear dielectric ceramic capacitor made of a barium titanate polycrystalline substance has been used.

Figure 1:
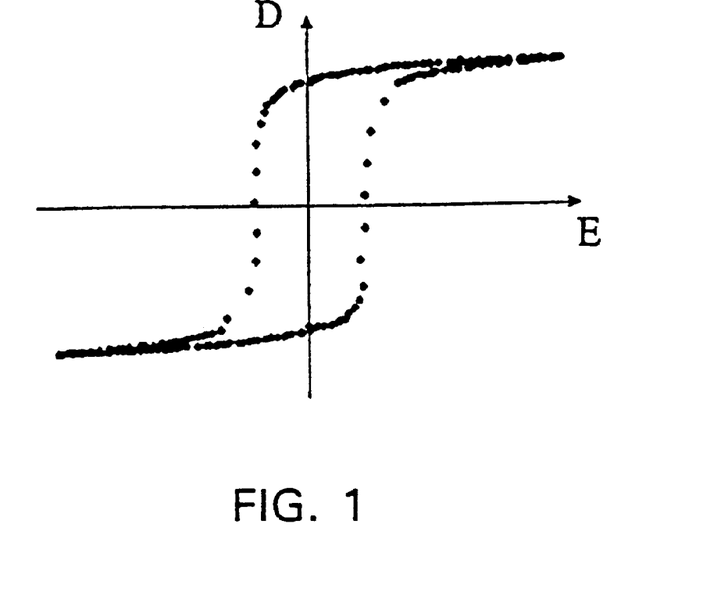
FIG. 1 is an exemplary D-E hysteresis characteristic profile of a non-linear dielectric ceramic which is incorporated into a capacitor of the present invention.

As shown in FIG. 1, such a non-linear dielectric ceramic capacitor exhibits a D-E hysteresis in which dielectric displacement (D) sharply changes with voltage (E), and when a voltage greater than the coercive field of the dielectric ceramic capacitor is applied to the capacitor, the amount of charge quickly reaches a saturation level in the vicinity of the polarization reversal voltage. Variation in current at this time causes a change in the ballast, so that a pulse of a high voltage corresponding to $-L \cdot di/dt$ is generated due to the inductance of the ballast.

A non-linear dielectric ceramic capacitor used for a high-pressure vapor discharge lamp such as a high-pressure sodium lamp is required to have a steep D-E hysteresis which is stable over a wide temperature range. Non-linear dielectric ceramic capacitors that meet such a requirement are disclosed in, for example, Japanese Patent Application Laid-Open (kokai) No. 63-221504, 63- 221505, 1-136323, and 1-136324.

In general, the interior of the outer bulb of a high-pressure vapor discharge lamp such as a high pressure sodium lamp is maintained at a high vacuum of $1 \times 10^{-5}$ torr, and during a period in which light is on, the interior of the outer bulb is exposed to high temperature (300° C.) and high vacuum ($1 \times 10^{-5}$ torr). Further, a barium getter is disposed inside the outer bulb in order to cause adsorption of oxygen generated when the discharge lamp is operated so that the degree of vacuum inside the outer bulb is maintained. However, when the discharge lamp is operated for a long period of time, the interior of the outer bulb becomes a reducing atmosphere due to hydrogen adsorbed onto the arc tube, a metal support for the arc tube, the glass or a like member that constitutes the outer bulb, or due to hydrogen generated as a result of decomposition of adsorbed water. Therefore, when a high-pressure vapor discharge lamp is used for a long period of time in a state in which a non-linear dielectric ceramic capacitor disclosed in, for example, Japanese Patent Application Laid-Open (kokai) No. 63-221504, 63-221505, 1-136323, or 1-136324 is built into the outer bulb to be used for pulse generation, the dielectric ceramic is reduced, and thus the insulating resistance decreases resulting in the problem that the voltage of generated pulses decreases, or no pulse is generated, with the result that the discharge lamp does not start.

In order to solve this problem, there have been proposed the measure disclosed in Japanese Patent Application Laid-Open (kokai) No. 60-52006 in which a dielectric ceramic capacitor is completely coated with inorganic glass except for its electricity supply portions, and a measure disclosed in Japanese Patent Application Laid-Open (kokai) No. 4-34832 in which a hydrogen adsorption getter is disposed inside the outer bulb. However, these measures cannot suppress deterioration of the non-linear dielectric ceramic capacitor. In addition, the structure of the capacitor for pulse generation and the discharge lamp becomes complex, resulting in increased cost. Further, if the dielectric ceramic capacitor is completely coated with inorganic glass as in the invention of Japanese Patent Application Laid-Open (kokai) No. 60-52006, the D-E hysteresis characteristics of the dielectric ceramic capacitor deteriorate due to the glass so that high voltage pluses cannot be generated in some cases.

SUMMARY OF THE INVENTION

In view of the foregoing, an object of the present invention is to provide an inexpensive capacitor for pulse generation (hereinafter may be referred to as a pulse-generating capacitor) whose characteristics do not deteriorate even when the capacitor is used in a high temperature, high vacuum, reducing atmosphere, and which enables generation of high-voltage pulses over a wide temperature range.

In one aspect of the present invention, there is provided a pulse-generating capacitor which is used inside an outer bulb of a high-pressure vapor discharge lamp, said capacitor comprising a dielectric element constituted of a non-linear dielectric ceramic which exhibits resistance against reduction.

Preferably, the non-linear dielectric ceramic which exhibits resistance against reduction comprises a polycrystalline substance containing barium titanate as a primary component, and when the polycrystalline substance is represented by the following formula:

$(1-a-b)ABO_3 + aM + bR$ wherein $ABO_3$ is the barium titanate component and represents a perovskite structure, M is an oxide of at least one element selected from the group consisting of Mn, Ni and Co, R is an oxide of at least one element selected from the group consisting of La, Ce, Nd, Pr, Sm, Eu, Gd, Tb, Dy, Ho, Er and Yb, and a and b represent mole fractions, A, B, a, and b satisfy the following relationships:

$1.000 \leq A/B \leq 1.006$ (mole ratio)

$0.3 \leq b/a \leq 3$ $0.0015 \leq a \leq 0.0050$ and $0.0015 \leq b \leq 0.0050$ and a total content of M and R represented by Ad satisfies $0.3 < Ad \leq 1.0$ (wt. %).

These ranges will be collectively referred to as a first preferable range.

Also preferably, the non-linear dielectric ceramic further comprises an oxide containing Si as a main component in an amount of about 0.005–0.1 parts by weight with respect to 100 parts by weight of the polycrystalline substance. This range for the Si-containing oxide and the aforementioned ranges, i.e., $1.000 \leq A/B \leq 1.006$ (mole ratio), $0.3 \leq b/a \leq 3$, $0.0015 \leq a \leq 0.0050$, $0.0015 \leq b \leq 0.0050$, $0.3 < Ad \leq 1.0$ (wt. %), will hereafter be collectively referred to as a second preferable range.

Also preferably, the above-described $ABO_3$ when represented by $\{(Ba_{1-x-y-z}Sr_xCa_yMg_z)O\}_m(Ti_{1-\phi-p}Zr_\phi Hf_p)O_2$ is such that x, y, z, $\phi$, p, and m satisfy the following relationships:

$0 \leq x \leq 0.05$ $0 \leq y \leq 0.02$ $0 \leq z \leq 0.005$ $0 \leq \phi \leq 0.12$ $0 \leq p \leq 0.12$ $0.0035 \leq \phi + p \leq 0.12$ $1.000 \leq m \leq 1.006$.

These ranges will be collectively referred to as a third preferable range.

In another aspect of the present invention, there is provided a dielectric ceramic which comprises a polycrystalline substance containing barium titanate as a primary component, wherein when the polycrystalline substance is represented by the following formula:

$(1-a-b)ABO_3+aM+bR$ wherein $ABO_3$ is the barium titanate component and represents a perovskite structure, M is an oxide of at least one element selected from the group consisting of Mn, Ni and Co, R is an oxide of at least one element selected from the group consisting of La, Ce, Nd, Pr, Sm, Eu, Gd, Tb, Dy, Ho, Er and Yb, and a and b represent mole fractions, A, B, a, and b satisfy the following relationships:

$1.000 \leq A/B \leq 1.006$ (mole ratio)

$0.3 \leq b/a \leq 3$ $0.0015 \leq a \leq 0.0050$ and $0.0015 \leq b \leq 0.0050$ and a total content of M and R represented by Ad satisfies $0.3 < Ad \leq 1.0$ (wt. %).

In yet another aspect of the present invention, there is provided a dielectric ceramic which comprises a polycrystalline substance containing barium titanate as a primary component, and when the polycrystalline substance is represented by the following formula:

$(1-a-b)ABO_3+aM+bR$ wherein $ABO_3$ is the barium titanate component and represents a perovskite structure, M is an oxide of at least one element selected from the group consisting of Mn, Ni and Co, R is an oxide of at least one element selected from the group consisting of La, Ce, Nd, Pr, Sm, Eu, Gd, Tb, Dy, Ho, Er and Yb, and a and b represent mole fractions, A, B, a, and b satisfy the following relationships:

$1.000 \leq A/B \leq 1.006$ (mole ratio)

$0.3 \leq b/a \leq 3$ $0.0015 \leq a \leq 0.0050$ and $0.0015 \leq b \leq 0.0050$ and a total content of M and R represented by Ad satisfies $0.3 < Ad \leq 1.0$ (wt. %), and the dielectric ceramic further comprises an oxide containing Si as a main component in an amount of about 0.005–0.1 parts by weight with respect to 100 parts by weight of the polycrystalline substance.

Preferably, the above-described $ABO_3$ when represented by $\{(Ba_{1-x-y-z}Sr_xCa_yMg_z)O\}_m(Ti_{1-\phi-p}Zr_\phi Hf_p)O_2$ that x, y, z, $\phi$, p, and m satisfy the following relationships:

$0 \leq x \leq 0.05$ $0 \leq y \leq 0.02$ $0 \leq z \leq 0.005$ $0 \leq \phi \leq 0.12$ $0 \leq p \leq 0.12$ $0.0035 \leq \phi + p \leq 0.12$ $1.000 \leq m \leq 1.006$.

In a still further aspect of the present invention, there is provided a high-pressure metal vapor discharge lamp using as a starter a capacitor of the present invention.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in conjunction with accompanying drawings, in which.

DETAILED DESCRIPTION OF PREFERRED EMBODIMENTS

The pulse-generating capacitor of the present invention will be described with reference to the drawings.

Figure 2:
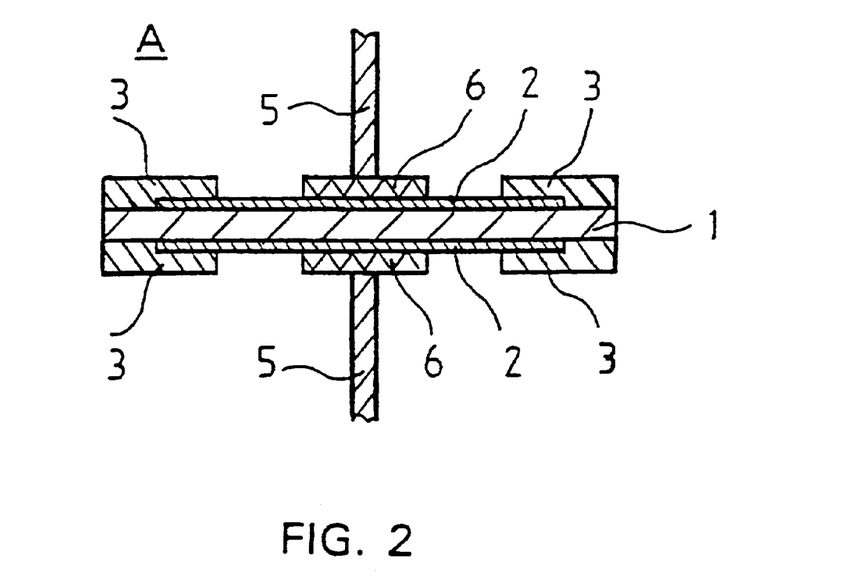
FIG. 2 is a cross-sectional view of an exemplary pulse-generating capacitor of the present invention.

FIG. 2 is a cross-sectional view of a pulse-generating capacitor A according to one embodiment of the present invention. Pulse-generating capacitor A is fabricated as follows. First, a starting material ceramic powder composed of various components at predetermined proportions is mixed with a binder. The resultant material is mixed, dried, granulated and then formed into a disk-shaped molded product by, for example, press molding. The molded product is fired so as to obtain a non-linear dielectric ceramic 1 which is to serve as a dielectric element. Subsequently, electrodes 2 are formed on the two major surfaces of the non-linear dielectric ceramic 1 by, for example, burning. Thereafter, rings made of insulation glass 3 are provided for insulation. Lead terminals 5 are connected to the electrodes by use of a conductive adhesive 6 so as to establish electrical connection to thereby obtain a pulse-generating capacitor A.

The non-linear dielectric ceramic is constructed of a polycrystalline substance containing barium titanate as a primary component. The barium titanate is expressed by $ABO_3$, which is a formula representing a perovskite structure. In the present invention, the A/B mole ratio is controlled and moreover, an oxide of at least one element selected from the group consisting of Mn, Ni and Co, and an oxide of at least one element selected from the group consisting of La, Ce, Nd, Pr, Sm, Eu, Gd, Tb, Dy, Ho, Er and Yb are added and incorporated in specific amounts so as to secure resistance to reduction and to obtain a steep D-E hysteresis. Therefore, even when the capacitor is exposed to a high-temperature, high-vacuum, reducing atmosphere, a high pulse voltage can be obtained while not permitting a decrease in insulation resistance.

The proper selection of A/B ratio and addition of an oxide of Mn, Ni or Co are effective in improving resistance to reduction. However, it should be noted that these two alone cannot provide a steep D-E hysteresis and cannot ensure a high pulse voltage. Therefore, in a characteristic feature of the present invention, an oxide of an element selected from among La, Ce, Nd, Pr, Sm, Eu, Gd, Tb, Dy, Ho, Er and Yb is also added, and the ratio of the amount thereof to that of the oxide of Mn, Ni or Co is adjusted to thereby secure both sufficient resistance to reduction and satisfactory pulse voltage characteristics.

Through a further incorporation of an oxide containing Si as a main component, excellent reproducibility of sintering-related properties of the non-linear dielectric ceramic can be obtained, resulting in ceramics whose constitutional grains have a size of small variation. This provides a high voltage of generated pulses and an increase in breakdown voltage.

EXAMPLES

The present invention will next be described in detail by way of examples. However, the invention is not limited only to these examples.

Example 1

$BaCO_3$, $CaCO_3$, $SrCO_3$, $MgCO_3$, $TiO_2$, $ZrO_2$ and $Hf_2O_3$ each having a purity of 99% or more were provided as starting materials.

These starting materials were mixed to produce compositions represented by $$\{(Ba_{1-x-y-z}Sr_xCa_yMg_z)O\}_m(Ti_{1-\phi-p}Zr_\phi Hf_p)O_2$$

in which x, y, z, φ, p and m assume the values shown in Table 1. Each composition was wet-blended by use of a ball mill, crushed, dried and calcined in air at 1120° C. for 2 hours to obtain a compact. The resultant compact was crushed by use of a dry-crusher to yield a crushed material having a particle diameter of 1 μm or less.

TABLE 1

| Sample No. | x | y | z | m | φ | p | φ + p |
|---|---|---|---|---|---|---|---|
| *1 | 0.10 | 0.01 | 0.003 | 1.004 | 0.03 | 0.04 | 0.07 |
| *2 | 0.01 | 0.05 | 0.001 | 1.003 | 0.04 | 0.01 | 0.05 |
| *3 | 0.03 | 0.005 | 0.010 | 1.001 | 0.02 | 0.02 | 0.04 |
| *4 | 0.02 | 0.015 | 0.004 | 1.002 | 0.005 | 0.005 | 0.01 |
| *5 | 0.04 | 0.01 | 0.003 | 1.003 | 0.18 | 0.02 | 0.2 |
| *6 | 0.04 | 0.015 | 0.002 | 0.995 | 0.03 | 0.03 | 0.06 |
| *7 | 0.01 | 0.015 | 0.003 | 1.010 | 0.04 | 0.06 | 0.1 |
| *8 | 0.03 | 0.01 | 0.002 | 1.003 | 0.05 | 0.04 | 0.09 |
| *9 | 0.02 | 0.005 | 0.002 | 1.004 | 0.01 | 0.05 | 0.06 |
| *10 | 0.03 | 0.01 | 0.004 | 1.003 | 0.06 | 0.05 | 0.11 |
| *11 | 0.04 | 0.01 | 0.001 | 1.005 | 0.02 | 0.03 | 0.05 |
| *12 | 0.02 | 0.005 | 0.001 | 1.001 | 0.07 | 0.02 | 0.09 |
| *13 | 0.01 | 0.005 | 0.002 | 1.005 | 0.03 | 0.04 | 0.07 |
| *14 | 0.03 | 0.015 | 0.003 | 1.002 | 0.01 | 0.03 | 0.04 |
| *15 | 0.04 | 0.005 | 0.004 | 1.005 | 0.02 | 0.01 | 0.03 |
| *16 | 0.04 | 0.015 | 0.002 | 1.002 | 0.02 | 0.05 | 0.07 |
| *17 | 0.02 | 0.01 | 0.002 | 1.002 | 0.04 | 0.03 | 0.07 |
| 18 | 0.03 | 0.01 | 0.004 | 1.000 | 0.07 | 0.01 | 0.08 |
| 19 | 0.02 | 0.015 | 0.001 | 1.006 | 0.05 | 0.02 | 0.07 |
| 20 | 0.01 | 0.005 | 0.004 | 1.001 | 0.01 | 0.09 | 0.1 |
| 21 | 0.03 | 0.005 | 0.003 | 1.005 | 0.06 | 0.02 | 0.08 |
| 22 | 0.04 | 0.01 | 0.004 | 1.003 | 0.08 | 0.03 | 0.11 |
| 23 | 0.03 | 0.005 | 0.002 | 1.003 | 0.09 | 0.01 | 0.1 |
| 24 | 0.01 | 0.015 | 0.003 | 1.004 | 0.05 | 0.04 | 0.09 |
| 25 | 0.04 | 0.015 | 0.001 | 1.002 | 0.10 | 0.01 | 0.11 |
| 26 | 0.02 | 0.01 | 0.003 | 1.002 | 0.02 | 0.02 | 0.04 |
| 27 | 0.01 | 0.01 | 0.004 | 1.003 | 0.04 | 0.03 | 0.07 |
| 28 | 0.01 | 0.015 | 0.002 | 1.001 | 0.07 | 0.01 | 0.08 |
| 29 | 0.03 | 0.01 | 0.001 | 1.005 | 0.09 | 0.02 | 0.11 |
| 30 | 0 | 0.005 | 0.002 | 1.005 | 0.03 | 0.06 | 0.09 |
| 31 | 0.05 | 0.01 | 0.004 | 1.004 | 0.08 | 0.03 | 0.11 |
| 32 | 0.03 | 0 | 0.004 | 1.002 | 0.01 | 0.05 | 0.06 |
| 33 | 0.02 | 0.02 | 0.003 | 1.003 | 0.06 | 0.02 | 0.08 |
| 34 | 0.03 | 0.015 | 0 | 1.001 | 0.04 | 0.01 | 0.05 |
| 35 | 0.03 | 0.01 | 0.005 | 1.003 | 0.05 | 0.04 | 0.09 |
| 36 | 0.01 | 0.015 | 0.001 | 1.005 | 0.005 | 0.03 | 0.035 |
| 37 | 0.04 | 0.015 | 0.004 | 1.001 | 0.10 | 0.02 | 0.12 |
| 38 | 0.01 | 0.005 | 0.001 | 1.004 | 0 | 0.12 | 0.12 |

TABLE 1-continued

| Sample No. | \{(Ba$_{1-x-y}$Sr$_x$Ca$_y$Mg$_z$)O\}$_m$(Ti$_{1-\phi-p}$Zr$_\phi$Hf$_p$)O$_2$ | | | | | | |
|---|---|---|---|---|---|---|---|
| | x | y | z | m | $\phi$ | p | $\phi + p$ |
| 39 | 0.03 | 0.005 | 0.003 | 1.005 | 0.12 | 0 | 0.12 |
| 40 | 0.02 | 0.015 | 0.002 | 1.002 | 0 | 0.05 | 0.05 |
| 41 | 0.04 | 0.01 | 0.004 | 1.003 | 0.05 | 0 | 0.05 |

To the crushed material were added MnCO$_3$, NiO, CoO, La$_2$O$_3$, CeO$_2$, Nd$_2$O$_3$, Pr$_6$O$_{11}$, Sm$_2$O$_3$, EU$_2$O$_3$, Gd$_2$O$_3$, Tb$_2$O$_3$, Dy$_2$O$_3$, Ho$_2$O$_3$, Er$_2$O$_3$, Yb$_2$O$_3$ and SiO$_2$ so as to obtain compositions as shown in Tables 2 and 3. Further, polyvinyl alcohol (3 wt. %) and pure water were added thereto, and each of the resultant mixtures was wet-blended by use of a ball mill, dried, subjected to granulation and molded under a pressure of 2 tons/cm$^2$ to thereby obtain disk-shaped molded products.

TABLE 2

| | aM | | | | bR | | | | | |
|---|---|---|---|---|---|---|---|---|---|---|
| Sample No. | MnO | NiO | CoO | Total of "a" | La$_2$O$_3$ | CeO$_2$ | Nd$_2$O$_3$ | Pr$_6$O$_{11}$ | Sm$_2$O$_3$ | Eu$_2$O$_3$ |
| *1 | 0.002 | 0.001 | 0 | 0.003 | 0 | 0 | 0.002 | 0 | 0 | 0 |
| *2 | 0.002 | 0 | 0.001 | 0.003 | 0.002 | 0 | 0 | 0 | 0 | 0 |
| *3 | 0.002 | 0.001 | 0 | 0.003 | 0 | 0 | 0.002 | 0 | 0 | 0 |
| *4 | 0.001 | 0.001 | 0.002 | 0.004 | 0 | 0.002 | 0 | 0 | 0 | 0 |
| *5 | 0.002 | 0 | 0 | 0.002 | 0 | 0.002 | 0 | 0 | 0 | 0 |
| *6 | 0.002 | 0 | 0.001 | 0.003 | 0.002 | 0 | 0 | 0 | 0 | 0 |
| *7 | 0.001 | 0.001 | 0.001 | 0.003 | 0.002 | 0 | 0 | 0 | 0 | 0.001 |
| *8 | 0.001 | 0 | 0 | 0.001 | 0 | 0 | 0.002 | 0 | 0 | 0 |
| *9 | 0.004 | 0.002 | 0.002 | 0.008 | 0 | 0.002 | 0 | 0 | 0 | 0 |
| *10 | 0.001 | 0.001 | 0 | 0.002 | 0 | 0 | 0.0005 | 0.0005 | 0 | 0 |
| *11 | 0.002 | 0 | 0.001 | 0.003 | 0.001 | 0.003 | 0 | 0 | 0.001 | 0 |
| *12 | 0.002 | 0.002 | 0.002 | 0.006 | 0 | 0 | 0.0005 | 0 | 0 | 0 |
| *13 | 0.001 | 0.0005 | 0 | 0.0015 | 0 | 0.0005 | 0.002 | 0.0005 | 0 | 0 |
| *14 | 0 | 0.001 | 0 | 0.001 | 0.0005 | 0.001 | 0 | 0 | 0 | 0 |
| *15 | 0.001 | 0 | 0.004 | 0.005 | 0 | 0 | 0 | 0 | 0 | 0 |
| *16 | 0.002 | 0 | 0 | 0.002 | 0 | 0.002 | 0 | 0 | 0 | 0 |
| *17 | 0.001 | 0.001 | 0 | 0.002 | 0 | 0.002 | 0 | 0 | 0 | 0 |
| 18 | 0.002 | 0 | 0.001 | 0.003 | 0 | 0 | 0.002 | 0 | 0 | 0 |
| 19 | 0.002 | 0.001 | 0 | 0.003 | 0 | 0 | 0.002 | 0 | 0 | 0 |
| 20 | 0.001 | 0 | 0.0005 | 0.0015 | 0 | 0 | 0.002 | 0.0005 | 0 | 0 |

| | bR | | | | | | | | SiO$_2$ (Parts |
|---|---|---|---|---|---|---|---|---|---|
| Sample No. | Gd$_2$O$_3$ | Tb$_2$O$_3$ | Dy$_2$O$_3$ | Ho$_2$O$_3$ | Er$_2$O$_3$ | Yb$_2$O$_3$ | Total of "b" | b/a | M + R (wt %) | by weight) |
| *1 | 0 | 0 | 0 | 0 | 0 | 0 | 0.002 | 0.7 | 0.5 | 0.05 |
| *2 | 0 | 0 | 0 | 0 | 0.001 | 0 | 0.003 | 1 | 0.67 | 0.04 |
| *3 | 0 | 0 | 0 | 0 | 0 | 0.002 | 0.004 | 1.3 | 0.84 | 0.06 |
| *4 | 0 | 0 | 0 | 0 | 0 | 0 | 0.002 | 0.5 | 0.44 | 0.02 |
| *5 | 0 | 0.001 | 0 | 0.001 | 0 | 0 | 0.004 | 2 | 0.6 | 0.04 |
| *6 | 0 | 0 | 0 | 0 | 0 | 0 | 0.002 | 0.7 | 0.5 | 0.01 |
| *7 | 0 | 0 | 0 | 0 | 0 | 0 | 0.003 | 1 | 0.64 | 0.03 |
| *8 | 0 | 0 | 0 | 0 | 0 | 0 | 0.002 | 2 | 0.35 | 0.07 |
| *9 | 0 | 0 | 0 | 0 | 0 | 0.001 | 0.003 | 0.4 | 0.89 | 0.04 |
| *10 | 0 | 0 | 0 | 0 | 0 | 0 | 0.001 | 0.5 | 0.43 | 0.02 |
| *11 | 0.001 | 0 | 0 | 0 | 0 | 0 | 0.006 | 2 | 0.88 | 0.01 |
| *12 | 0 | 0 | 0.0005 | 0 | 0 | 0 | 0.001 | 0.2 | 0.59 | 0.02 |
| *13 | 0 | 0.001 | 0 | 0.0005 | 0.0005 | 0 | 0.005 | 3.3 | 0.96 | 0.03 |
| *14 | 0 | 0 | 0 | 0 | 0.0005 | 0 | 0.002 | 2 | 0.3 | 0.07 |
| *15 | 0 | 0 | 0 | 0 | 0.005 | 0 | 0.005 | 1 | 1.2 | 0.01 |
| *16 | 0.001 | 0 | 0 | 0 | 0 | 0 | 0.003 | 1.5 | 0.44 | 0 |
| *17 | 0 | 0 | 0 | 0.001 | 0 | 0 | 0.003 | 1.5 | 0.45 | 0.2 |
| 18 | 0 | 0 | 0 | 0 | 0 | 0 | 0.002 | 0.7 | 0.5 | 0.01 |
| 19 | 0 | 0 | 0 | 0 | 0 | 0 | 0.002 | 0.7 | 0.5 | 0.09 |
| 20 | 0.001 | 0 | 0 | 0 | 0.001 | 0 | 0.0045 | 3 | 0.9 | 0.02 |

TABLE 3

| Sample No. | aM | | | | bR | | | | | |
|---|---|---|---|---|---|---|---|---|---|---|
| | MnO | NiO | CoO | Total of "a" | $La_2O_3$ | $CeO_2$ | $Nd_2O_3$ | $Pr_6O_{11}$ | $Sm_2O_3$ | $Eu_2O_3$ |
| 21 | 0.002 | 0.001 | 0.002 | 0.005 | 0 | 0 | 0.001 | 0 | 0 | 0 |
| 22 | 0.001 | 0.0005 | 0 | 0.0015 | 0.002 | 0 | 0 | 0 | 0.001 | 0 |
| 23 | 0.003 | 0.001 | 0.001 | 0.005 | 0.002 | 0 | 0 | 0 | 0 | 0 |
| 24 | 0.002 | 0 | 0.001 | 0.003 | 0.001 | 0 | 0 | 0 | 0 | 0 |
| 25 | 0.002 | 0 | 0.001 | 0.003 | 0.003 | 0.002 | 0 | 0 | 0 | 0 |
| 26 | 0.002 | 0 | 0 | 0.002 | 0.0005 | 0.0015 | 0 | 0 | 0 | 0 |
| 27 | 0.002 | 0 | 0.002 | 0.004 | 0.003 | 0 | 0.001 | 0 | 0 | 0.001 |
| 28 | 0.002 | 0 | 0 | 0.002 | 0 | 0 | 0.002 | 0 | 0 | 0 |
| 29 | 0.001 | 0.001 | 0 | 0.002 | 0 | 0 | 0.002 | 0 | 0 | 0 |
| 30 | 0.002 | 0 | 0.001 | 0.003 | 0 | 0.001 | 0.001 | 0.001 | 0 | 0 |
| 31 | 0.002 | 0.001 | 0 | 0.003 | 0 | 0.001 | 0.001 | 0 | 0 | 0 |
| 32 | 0.002 | 0 | 0.002 | 0.004 | 0 | 0.001 | 0.001 | 0 | 0 | 0.001 |
| 33 | 0.002 | 0.002 | 0 | 0.004 | 0 | 0.002 | 0 | 0 | 0 | 0 |
| 34 | 0.001 | 0.002 | 0 | 0.003 | 0 | 0.002 | 0 | 0 | 0 | 0 |
| 35 | 0.002 | 0.001 | 0 | 0.003 | 0 | 0.002 | 0 | 0 | 0 | 0 |
| 36 | 0.002 | 0 | 0.002 | 0.004 | 0 | 0 | 0.001 | 0.001 | 0 | 0 |
| 37 | 0.002 | 0.001 | 0 | 0.003 | 0 | 0 | 0.002 | 0 | 0.001 | 0 |
| 38 | 0.002 | 0 | 0.002 | 0.004 | 0.001 | 0.001 | 0 | 0 | 0 | 0 |
| 39 | 0.003 | 0 | 0.001 | 0.004 | 0.001 | 0.001 | 0 | 0 | 0 | 0 |
| 40 | 0.001 | 0.001 | 0.001 | 0.003 | 0.001 | 0 | 0.001 | 0 | 0 | 0 |
| 41 | 0.002 | 0 | 0 | 0.002 | 0.001 | 0 | 0.001 | 0 | 0 | 0.001 |

| Sample No. | bR | | | | | | | b/a | M + R (wt %) | $SiO_2$ (Parts by weight) |
|---|---|---|---|---|---|---|---|---|---|---|
| | $Gd_2O_3$ | $Tb_2O_3$ | $Dy_2O_3$ | $Ho_2O_3$ | $Er_2O_3$ | $Yb_2O_3$ | Total of "b" | | | |
| 21 | 0 | 0.0005 | 0 | 0 | 0 | 0 | 0.00015 | 0.3 | 0.59 | 0.07 |
| 22 | 0 | 0 | 0.001 | 0 | 0 | 0 | 0.004 | 2.7 | 0.69 | 0.05 |
| 23 | 0 | 0 | 0 | 0 | 0 | 0 | 0.002 | 0.4 | 0.64 | 0.02 |
| 24 | 0 | 0.0003 | 0 | 0 | 0.0002 | 0 | 0.0015 | 0.5 | 0.43 | 0.03 |
| 25 | 0 | 0 | 0 | 0 | 0 | 0 | 0.005 | 1.7 | 0.78 | 0.08 |
| 26 | 0 | 0 | 0 | 0 | 0 | 0 | 0.002 | 1 | 0.32 | .02 |
| 27 | 0 | 0 | 0 | 0 | 0 | 0 | 0.005 | 1.3 | 1 | 0.06 |
| 28 | 0 | 0 | 0 | 0.001 | 0 | 0 | 0.003 | 1.5 | 59 | 0.005 |
| 29 | 0.001 | 0 | 0 | 0 | 0 | 0 | 0.003 | 1.5 | 0.58 | 0.1 |
| 30 | 0 | 0 | 0.0005 | 0 | 0 | 0 | 0.0035 | 1.2 | 0.93 | 0.04 |
| 31 | 0 | 0 | 0 | 0 | 0 | 0 | 0.002 | 0.7 | 0.43 | 0.06 |
| 32 | 0 | 0 | 0 | 0 | 0 | 0.001 | 0.004 | 1 | 0.83 | 0.01 |
| 33 | 0.001 | 0 | 0 | 0 | 0 | 0 | 0.003 | 0.8 | 0.59 | 0.04 |
| 34 | 0 | 0.001 | 0 | 0 | 0 | 0 | 0.003 | 1 | 0.53 | 0.02 |
| 35 | 0 | 0 | 0 | 0.001 | 0 | 0 | 0.003 | 1 | 0.52 | 0.05 |
| 36 | 0 | 0 | 0 | 0 | 0 | 0.005 | 0.0025 | 0.6 | 0.95 | 0.03 |
| 37 | 0 | 0 | 0 | 0 | 0 | 0 | 0.003 | 1 | 0.65 | 0.07 |
| 38 | 0 | 0 | 0 | 0 | 0.001 | 0 | 0.003 | 0.8 | 0.65 | 0.04 |
| 39 | 0.001 | 0 | 0 | 0 | 0 | 0 | 0.003 | 0.8 | 0.65 | 0.06 |
| 40 | 0 | 0 | 0.001 | 0 | 0 | 0 | 0.003 | 1 | 0.66 | 0.03 |
| 41 | 0 | 0 | 0 | 0 | 0 | 0 | 0.003 | 1.5 | 0.58 | 0.07 |

Subsequently, the resultant molded products were fired at temperatures shown in Table 4 for 2 hours to obtain non-linear dielectric ceramics each having a diameter of 18 mm and a thickness of 0.6 mm.

As shown in FIG. 2, electrodes made of silver and having a diameter of 16 mm were formed on the two major surfaces of each dielectric ceramic by burning. Further, insulation glass rings made of glass ceramic and having an outer diameter of 17 mm and an inner diameter of 14 mm were provided. Subsequently, lead terminals made of nickel were connected to the above-described electrodes by use of a conductive adhesive to thereby obtain a pulse-generating capacitor A.

Figure 4:
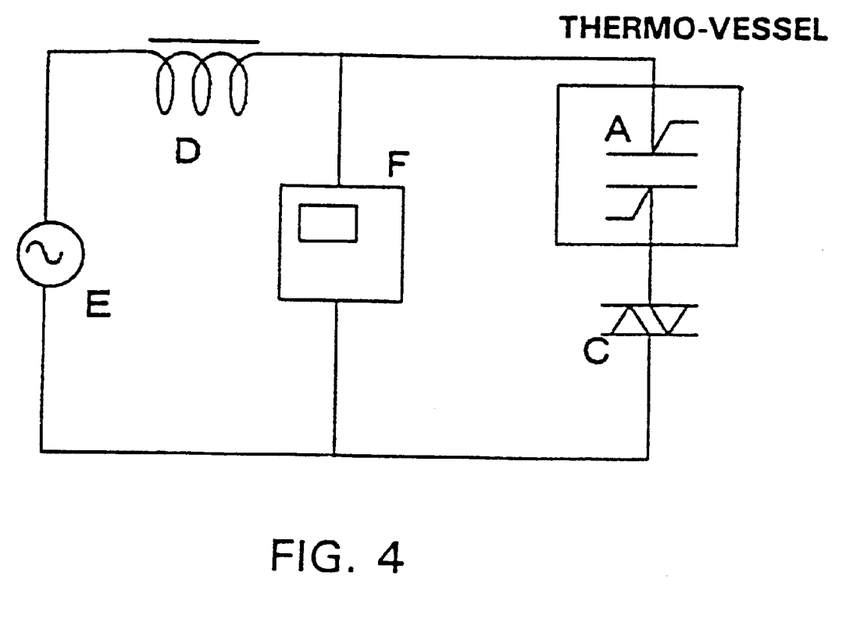
FIG. 4 is a diagram showing a pulse-generating circuit and a pulse-measuring circuit.

The voltage of generated pulses was measured for the resultant capacitor at −40° C., at room temperature (20° C.) and at 50° C. by use of a pulse generating circuit and a pulse-measuring circuit shown in FIG. 4. The pulse-generating capacitor A fabricated as described above was placed within a thermo-vessel. A semiconductor switch C having a breakover voltage of 150 V and a ballast D for use with a 400 watt high-pressure mercury lamp (power supply: 220 V, 60 Hz) were connected in series to the capacitor A. The thus-formed series circuit was connected to an AC power supply E (100-Vac, 60-Hz) to thereby complete the pulse-generating circuit. The voltage of generated pulses (hereinafter simply referred to as pulse voltage) was measured through use of an oscilloscope F connected between the opposite ends of a series circuit including the capacitor A and the semiconductor C.

Then, the insulation resistance was measured by applying 100 Vdc for 2 minutes by use of an insulation resistance meter, and volume resistivity ($\rho$) was calculated.

In order to measure time-course change of properties under high temperature and in a reducing atmosphere, each of the capacitors was allowed to stand for 1000 hours in a vacuum chamber (400° C., $1 \times 10^{-5}$ torr, hydrogen concentration: 0.5%). The pulse voltage of the capacitors after being allowed to so stand was measured at room temperature (20° C.) by use of the pulse generating circuit and the pulse measuring circuit shown in FIG. 4. The insulation resistance was measured and the volume resistivity ($\rho$) was calculated.

AC breakdown voltage was measured as follows. Silver electrodes having a diameter of 14 mm were formed, by burning, on the two major surfaces of each non-linear dielectric ceramic having a diameter of 18 mm and a thickness of 0.6 mm which had been obtained through firing at temperatures shown in Table 4 to thereby produce sample capacitors. The voltage of each sample was measured upon breakage of the sample after being subjected to rising voltage applied at 60 Hz, 100 Vrms/second in a silicone-oil bath.

The complete results of the tests are shown in Table 4. Sample Nos. 6 to 15 in Tables 1 to 4 fall outside the first preferable range. Sample Nos. 6 to 17 fall outside the second preferable range. Sample Nos. 1 to 17 fall outside the third preferable range, and are marked with "*." That is, Sample Nos. 18 to 41 fall within the most preferred ranges according to the present invention.

TABLE 4

| Sample No. | Firing temp. ° C. | Voltage of generated pulses (kV) −40° C. | Voltage of generated pulses (kV) Room temp. | Voltage of generated pulses (kV) 50° C. | Volume resistivity $\rho$ ($\Omega$-m) | 400° C./1 × 10$^{-5}$Torr/0.5% H$_2$, After 1000 hr Voltage of generated pulses (kV) | 400° C./1 × 10$^{-5}$Torr/0.5% H$_2$, After 1000 hr Volume resistivity $\rho$ ($\Omega$-m) | AC breakdown voltage (kV/mm) |
|---|---|---|---|---|---|---|---|---|
| *1 | 1340 | 1.91 | 1.84 | 1.35 | 3.51 × 10$^{12}$ | 1.77 | 1.24 × 10$^{12}$ | 6.24 |
| *2 | 1320 | 1.59 | 1.48 | 1.37 | 2.96 × 10$^{12}$ | 1.42 | 9.52 × 10$^{10}$ | 6.08 |
| *3 | 1300 | 1.57 | 1.42 | 1.31 | 1.36 × 10$^{12}$ | 1.37 | 9.87 × 10$^{10}$ | 4.92 |
| *4 | 1320 | 1.59 | 1.45 | 1.34 | 6.52 × 10$^{11}$ | 1.55 | 8.51 × 10$^{11}$ | 6.25 |
| *5 | 1340 | 1.82 | 1.59 | 1.36 | 3.05 × 10$^{12}$ | 1.64 | 1.62 × 10$^{12}$ | 6.49 |
| *6 | 1300 | 2.00 | 1.82 | 1.71 | 4.34 × 10$^{12}$ | 1.18 | 5.60 × 10$^{7}$ | 4.15 |
| *7 | 1380 | 1.48 | 1.33 | 1.22 | 2.46 × 10$^{12}$ | 1.33 | 2.46 × 10$^{12}$ | 9.52 |
| *8 | 1320 | 2.03 | 1.85 | 1.74 | 6.42 × 10$^{11}$ | 1.11 | 4.43 × 10$^{7}$ | 6.18 |
| *9 | 1340 | 1.58 | 1.43 | 1.35 | 2.87 × 10$^{12}$ | 1.53 | 1.09 × 10$^{12}$ | 6.41 |
| *10 | 1320 | 1.57 | 1.48 | 1.37 | 8.27 × 10$^{11}$ | 1.68 | 5.61 × 10$^{11}$ | 6.54 |
| *11 | 1360 | 1.58 | 1.45 | 1.34 | 2.87 × 10$^{11}$ | 1.39 | 5.05 × 10$^{10}$ | 5.55 |
| *12 | 1320 | 1.74 | 1.60 | 1.49 | 2.21 × 10$^{12}$ | 1.50 | 1.03 × 10$^{12}$ | 6.13 |
| *13 | 1360 | 1.96 | 1.81 | 1.70 | 4.18 × 10$^{11}$ | 1.29 | 3.71 × 10$^{7}$ | 4.66 |
| *14 | 1300 | 2.03 | 1.88 | 1.77 | 8.40 × 10$^{11}$ | 1.25 | 5.22 × 10$^{7}$ | 6.54 |
| *15 | 1360 | 1.79 | 1.59 | 1.48 | 1.91 × 10$^{12}$ | 1.54 | 1.73 × 10$^{12}$ | 6.59 |
| *16 | 1340 | 1.48 | 1.36 | 1.25 | 2.68 × 10$^{12}$ | 1.31 | 9.47 × 10$^{11}$ | 3.87 |
| *17 | 1300 | 1.73 | 1.58 | 1.47 | 1.81 × 10$^{12}$ | 1.58 | 1.66 × 10$^{12}$ | 6.48 |
| 18 | 1320 | 2.24 | 2.09 | 1.98 | 1.08 × 10$^{12}$ | 2.11 | 1.07 × 10$^{12}$ | 6.09 |
| 19 | 1360 | 2.13 | 1.98 | 1.87 | 2.82 × 10$^{12}$ | 1.97 | 2.84 × 10$^{12}$ | 6.38 |
| 20 | 1320 | 2.10 | 1.95 | 1.84 | 2.21 × 10$^{12}$ | 1.96 | 2.21 × 10$^{12}$ | 6.11 |
| 21 | 1360 | 2.20 | 1.94 | 1.82 | 3.14 × 10$^{12}$ | 1.94 | 3.15 × 10$^{12}$ | 6.24 |
| 22 | 1320 | 2.19 | 2.06 | 1.97 | 2.44 × 10$^{12}$ | 2.04 | 2.43 × 10$^{12}$ | 6.18 |
| 23 | 1340 | 2.14 | 1.99 | 1.88 | 3.45 × 10$^{12}$ | 1.99 | 3.45 × 10$^{12}$ | 6.49 |
| 24 | 1340 | 2.21 | 2.06 | 1.95 | 6.53 × 10$^{12}$ | 2.05 | 6.51 × 10$^{12}$ | 6.04 |
| 25 | 1300 | 2.19 | 2.04 | 1.93 | 6.31 × 10$^{12}$ | 2.06 | 6.33 × 10$^{12}$ | 6.43 |
| 26 | 1340 | 2.27 | 2.12 | 2.05 | 7.14 × 10$^{12}$ | 2.12 | 7.13 × 10$^{12}$ | 6.62 |
| 27 | 1320 | 2.20 | 2.05 | 1.94 | 6.42 × 10$^{12}$ | 2.04 | 6.43 × 10$^{12}$ | 6.55 |
| 28 | 1340 | 2.08 | 1.93 | 1.82 | 3.23 × 10$^{12}$ | 1.92 | 3.23 × 10$^{12}$ | 6.04 |
| 29 | 1340 | 2.19 | 2.04 | 1.93 | 3.33 × 10$^{12}$ | 2.02 | 3.32 × 10$^{12}$ | 6.54 |
| 30 | 1360 | 2.04 | 1.89 | 1.83 | 4.83 × 10$^{12}$ | 1.90 | 4.82 × 10$^{12}$ | 6.39 |
| 31 | 1320 | 2.10 | 1.95 | 1.84 | 5.39 × 10$^{12}$ | 1.94 | 5.39 × 10$^{12}$ | 6.45 |
| 32 | 1340 | 2.21 | 2.06 | 2.00 | 2.95 × 10$^{12}$ | 2.06 | 2.93 × 10$^{12}$ | 6.56 |
| 33 | 1320 | 2.10 | 1.95 | 1.84 | 5.36 × 10$^{12}$ | 1.95 | 5.35 × 10$^{12}$ | 6.45 |
| 34 | 1320 | 2.13 | 1.98 | 1.87 | 2.65 × 10$^{12}$ | 1.99 | 2.66 × 10$^{12}$ | 6.08 |
| 35 | 1320 | 2.07 | 1.92 | 1.81 | 5.09 × 10$^{12}$ | 1.91 | 5.09 × 10$^{12}$ | 6.11 |
| 36 | 1360 | 2.16 | 2.01 | 1.86 | 4.92 × 10$^{12}$ | 1.99 | 4.91 × 10$^{12}$ | 6.51 |
| 37 | 1300 | 2.09 | 1.94 | 1.83 | 5.21 × 10$^{12}$ | 1.94 | 5.20 × 10$^{12}$ | 6.44 |
| 38 | 1340 | 2.08 | 1.93 | 1.82 | 5.12 × 10$^{12}$ | 1.91 | 5.14 × 10$^{12}$ | 6.43 |
| 39 | 1340 | 2.09 | 1.94 | 1.83 | 5.23 × 10$^{12}$ | 1.93 | 5.22 × 10$^{12}$ | 6.44 |
| 40 | 1320 | 2.20 | 2.05 | 1.94 | 4.35 × 10$^{12}$ | 2.06 | 4.36 × 10$^{12}$ | 6.55 |
| 41 | 1300 | 2.22 | 2.07 | 1.96 | 5.25 × 10$^{12}$ | 2.05 | 5.23 × 10$^{12}$ | 6.57 |

As is apparent from Tables 1 to 4, the pulse-generating capacitors of the present invention which fall within the most preferred ranges, i.e., a third preferable range, have a pulse voltage of as high as 1.8 kV or more within the temperature range of −40 to 50° C. Moreover, even when the capacitors are exposed to a high-temperature, reducing atmosphere, the breakdown voltages thereof do not decrease and the pulse voltages also do not decrease. Further, the capacitors exhibit an AC breakdown voltage of as high as 6 kVrms/mm or more.

As described above, the dielectric ceramic of the present invention used for constituting a pulse-generating capacitor has a composition represented by the formula $(1-a-b)ABO_3+aM+bR$, wherein $ABO_3$ is a barium titanate component and represents a perovskite structure; M is an oxide of at least one element selected from the group consisting of Mn, Ni and Co; R is an oxide of at least one element selected from the group consisting of La, Ce, Nd, Pr, Sm, Eu, Gd, Tb, Dy, Ho, Er and Yb; and a and b represent mole fractions. The reason why the limitations in the composition of dielectric ceramic were determined will be described below.

A pulse-generating capacitor having the composition of Sample No. 6 in which A/B ratio—namely, the value of m when the formula $ABO_3$ is represented by $\{(Ba_{1-x-y-z}Sr_xCa_yMg_z)O\}_m(Ti_{1-\phi-p}Zr_\phi Hf_p)O_2$—is less than 1.000 has poor properties. That is, the capacitor has a drastically lowered pulse voltage because of a decrease in insulation resistance due to reduction of the dielectric ceramic upon exposure to a high-temperature, reducing atmosphere. A capacitor having the composition of Sample No. 7, in which the A/B ratio is more than 1.006, has also poor properties because of a decrease in pulse voltage.

In the case in which "a" (i.e., the mole fraction of M) is less than 0.0015—as in the case of Sample No. 8—a significant decrease in pulse voltage disadvantageously results upon exposure to a high-temperature, reducing atmosphere. Also, in the case in which "a" is in excess of 0.0050—as in the case of Sample No. 9—a decrease in pulse voltage disadvantageously results within the operating temperature range of −40° C. to 50° C.

In the case in which "b" (i.e., the mole fraction of R) is less than 0.0015—as in the case of Sample No. 10—or in excess of 0.005013 as in the case of Sample No. 11—a pulse voltage of higher than 1.8 kV cannot be obtained.

In the case in which "b/a" (i.e., the ratio of the mole fractions of M and R) is less than 0.3—as in the case of Sample No. 12—a significant decrease in pulse voltage disadvantageously results. Also, in the case in which the ratio is in excess of 3—as in the case of Sample No. 13—a decrease in pulse voltage disadvantageously results upon exposure to a high-temperature, reducing atmosphere.

In the case in which "Ad" (i.e., the total content of M and R) is 0.3 wt. % or less—as in the case of Sample No. 14—a decrease in volume resistivity and a significant decrease in pulse voltage disadvantageously result upon exposure to a high-temperature, reducing atmosphere. Also, in the case in which the total content "Ad" is in excess of 1.0 wt. %—as in the case of Sample No. 15—the pulse voltage of higher than 1.8 kV cannot be obtained.

In the case in which the amount of the oxide containing Si as a main component (i.e., the content of $SiO_2$) is less than about 0.005 parts by weight—as in the case of Sample No. 16—a pulse voltage of higher than 1.8 kV cannot be obtained, and a decrease in breakdown AC voltage disadvantageously result. When the lamp in which the capacitor is contained is operated repeatedly, the capacitor tends to cause a breakdown. Also, in the case in which the $SiO_2$ content is in excess of about 0.1 parts by weight—as in the case of Sample No. 17—a decrease in pulse voltage may result.

In the case in which the $ABO_3$ is represented by $\{(Ba_{1-x-y-z}Sr_xCa_yMg_z)O\}_m(Ti_{1-\phi-p}Zr_\phi Hf_p)O_2$, when "x" (i.e., the amount of Sr) is in excess of 0.05—as in the case of Sample No. 1—a pulse voltage of higher than 1.8 kV cannot be obtained at 50° C. However, the pulse voltage can be enhanced by the incorporation of Sr such that "x" is 0.05 or less.

In the case in which "y" (the amount of Ca) is in excess of 0.02—as in the case of Sample No. 2—a decrease in pulse voltage disadvantageously results. However, when "y" is 0.02 or less, the pulse voltage does not drop under a high-temperature, reducing atmosphere.

In the case in which "z" (the amount of Mg) is in excess of 0.005—as in the case of Sample No. 3—a pulse voltage of higher than 1.8 kV cannot be obtained. However, the incorporation of Mg such that "z" is 0.005 or less enhances resistance against reduction and prevents lowering of pulse voltage under a high-temperature, reducing atmosphere.

In the case in which "$\phi$+p" ("$\phi$" is the amount of Zr and "p" is the amount of Hf) is less than 0.035—as in the case of Sample No. 4—a decrease in pulse voltage disadvantageously results. In the case in which the "$\phi$+p" is in excess of 0.12—as in the case of Sample No. 5—a pulse voltage of higher than 1.8 kV cannot be obtained at room temperature or 50° C.

Example 2

A pulse-generating capacitor A corresponding to Sample No. 26 in Example 1, which falls within the third preferable range of the present invention, was produced, and a high-pressure sodium lamp which houses the capacitor A inside its outer bulb was fabricated.

Figure 6:
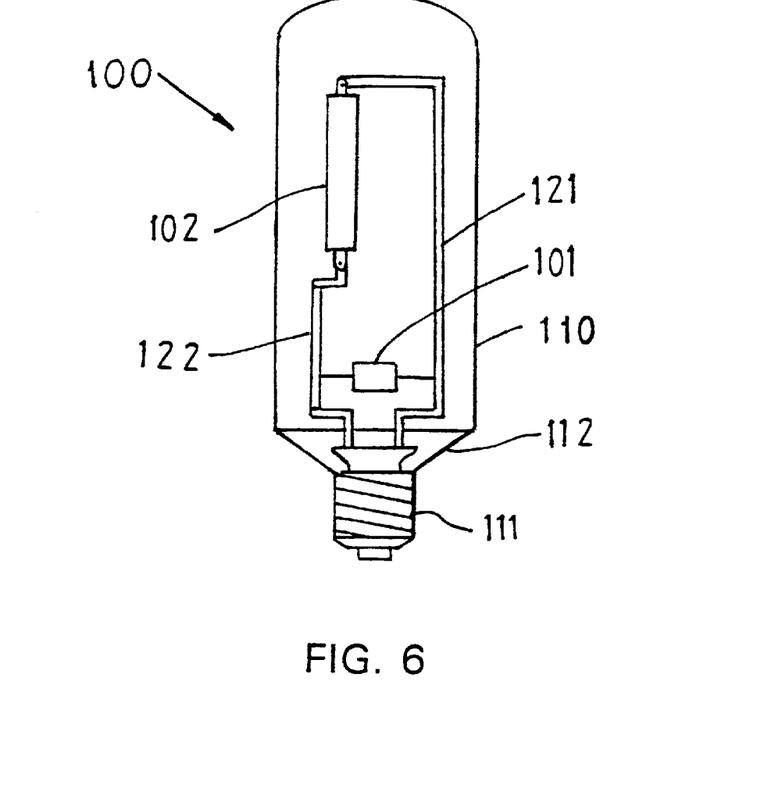
FIG. 6 is a sketch showing the structure of an example high-pressure sodium lamp incorporating a capacitor of the present invention.
Figure 7:
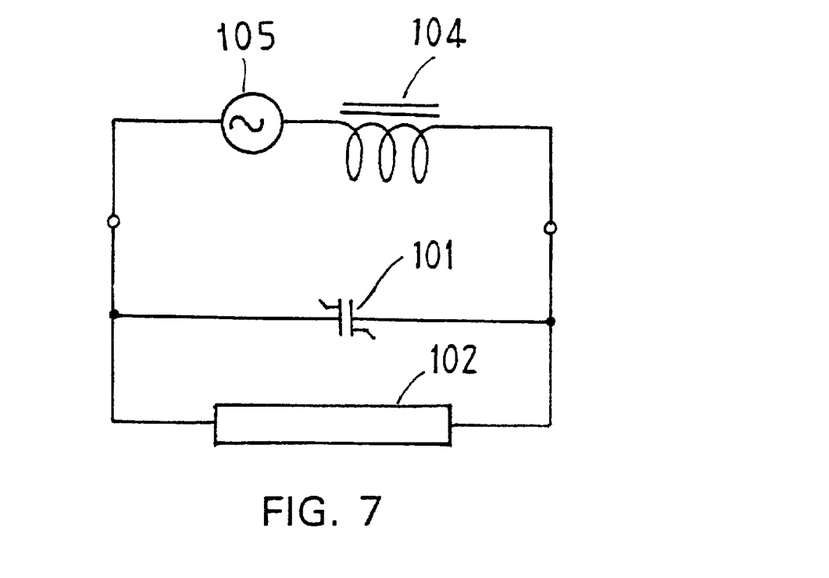
FIG. 7 is a circuit diagram for the lamp shown in FIG. 6.

FIG. 6 is a schematic plan view of a high-pressure sodium lamp using a non-linear capacitor of the present invention. FIG. 7 is a circuit therefor.

Reference numeral 102 indicates an arc tube of the high-pressure sodium lamp, and 101 indicates a starter. As the starter, the non-linear capacitor of the present invention is used. The capacitor is connected in parallel to the arc tube 102. The starter and the arc tube are housed inside an outer bulb 110 made of hard glass. Inside the outer bulb 110, a getter, e.g., a barium getter 112, is enclosed and the inside of the outer bulb is evacuated to a high vacuum. A cap 111 is provided at the end of the bulb 110, for establishing electrical connection with internal conductors 122 and 121.

The high-pressure sodium lamp is operated by use of a ballast 104 connected to an AC power supply 105.

Figure 3:
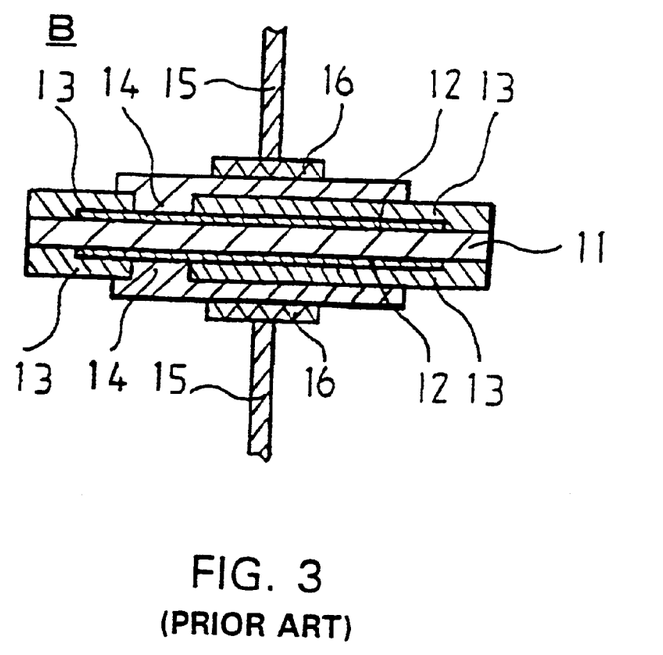
FIG. 3 (PRIOR ART) is a cross-sectional view of a conventional pulse-generating capacitor.

For comparison, the non-linear dielectric ceramic used for preparing a capacitor of Sample No. 14 in Example 1 was produced in a manner similar to that described in Example 1. The capacitor falls outside the first preferable range of the present invention. As shown in FIG. 3 (PRIOR ART), electrodes 12 made of silver having a diameter of 16 mm were formed on the two major surfaces of the non-linear dielectric ceramic 11 by burning. Further, insulation glass 13 containing glass ceramic was provided on the entire surfaces of the two major surfaces of the non-linear dielectric ceramic 11, except for the electricity supply portions 14. Subsequently, lead terminals 15 made of nickel were connected to electricity supply portions 14 by the mediation of a conductive adhesive 16, so that the lead terminals 15 are electrically connected to electrodes 12 via the electricity supply portions 14 to thereby complete a pulse-generating capacitor B. Also, a high-pressure sodium lamp having the capacitor B inside its outer bulb was produced.

Separately, as another comparative lamp, there was produced a high-pressure sodium lamp having both capacitor B and a hydrogen-adsorption getter inside the outer bulb. The hydrogen-adsorption getter was based on Zr/Al at a weight ratio of 87/13.

Using these three types of lamps, a lighting test was performed. A ballast for use with a 400 W high-pressure mercury lamp (power supply: 220 V, 60 Hz) was employed in the test. The cycle of lighting consists of 10-hr light-on and 1-hr light-off.

Figure 5:
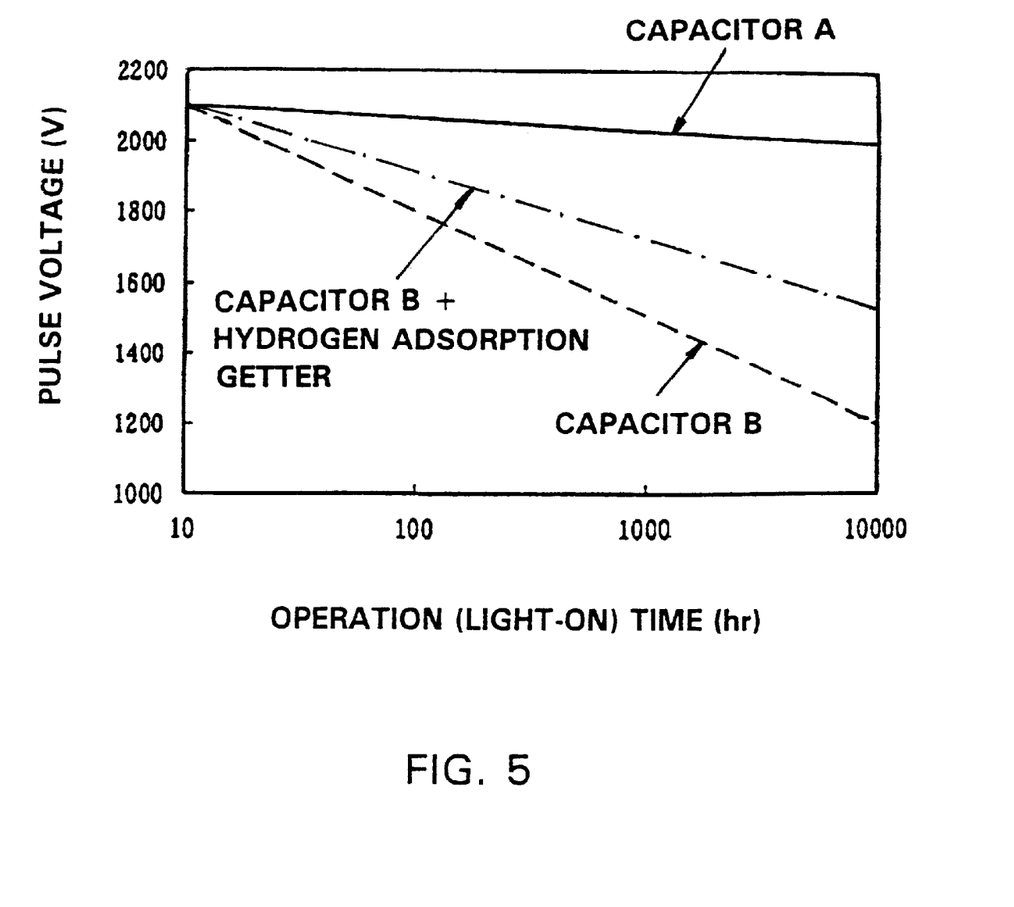
FIG. 5 is a graph showing the relationship between generated pulse voltage and operation time of the lamp, obtained from a pulse-generating capacitor.

FIG. 5 shows the change in generated pulse voltage versus lighting time of the lamp. As is apparent from FIG. 5, the capacitor A, which falls within the third preferable range of the present invention permits only a small decrease in pulse voltage; whereas the capacitor B, which falls outside the first preferable range of the present invention permits a noticeable decrease in pulse voltage even when used in combination with a hydrogen adsorption getter.

As described above, the pulse-generating capacitor of the present invention is constructed of a non-linear dielectric ceramic having resistance against a reducing atmosphere and a steep D-E hysteresis characteristic over a wide temperature range. Also, since the pulse-generating capacitor of the present invention does not have to be fully covered with insulating glass, deterioration in characteristics caused by such coating glass is avoided. Moreover, the capacitor has a high AC dielectric breakdown voltage.

Thus, the present invention can provide an inexpensive pulse-generating capacitor whose characteristics do not deteriorate even when the capacitor is used in a high temperature, high vacuum, reducing atmosphere, and which enables generation of high-voltage pulses over a wide temperature range.

Also, use of the pulse-generating capacitor of the present invention eliminates the need for a hydrogen adsorption getter in the outer bulb. Therefore, it is possible to obtain a reliable high-pressure vapor discharge tube of the "self-contained starter" type, which encloses a starter inside the outer bulb of the discharge tube, at low cost.

What is claimed is:

1. A capacitor for pulse generation which is used inside an outer bulb of a high-pressure vapor discharge lamp, said capacitor comprising two electrodes and a dielectric element comprising a non-linear dielectric ceramic which exhibits resistance against reduction, wherein the non-linear dielectric ceramic which exhibits resistance against reduction comprises a polycrystalline substance represented by the formula:

$$(1-a-b)ABO_3 + aM + bR$$

wherein $ABO_3$ is a barium titanate perovskite, M is an oxide of at least one element selected from the group consisting of Mn, Ni and Co, R is an oxide of at least one element selected from the group consisting of La, Ce, Nd, Pr, Sm, Eu, Gd, Tb, Dy, Ho, Er and Yb, a and b represent mole fractions, $$1.000 \leq A/B \leq 1.006 \text{ (mole ratio)}$$

$$0.3 \leq b/a \leq 3$$

$$0.0015 \leq a \leq 0.0050$$

and $$0.0015 \leq b \leq 0.0050$$

and the total content of M and R represented by Ad is $$0.3 \leq Ad \leq 1.0 \text{ (wt. \%)}.$$

2. The capacitor of claim 1 disposed in a high-pressure metal vapor discharge lamp as a starter capacitor.

3. The capacitor for pulse generation according to claim 1, wherein the non-linear dielectric ceramic further comprises a Si oxide in an amount of 0.005–0.1 parts by weight with respect to 100 parts by weight of the polycrystalline substance.

4. The capacitor of claim 3 disposed in a high-pressure metal vapor discharge lamp as a starter capacitor.

5. The capacitor for pulse generation according to claim 1, wherein when $ABO_3$ is $\{(Ba_{1-x-y-z}Sr_xCa_yMg_z)O\}_m(Ti_{1-\phi-p}Zr_\phi Hf_p)O_2$ $$0 \leq x \leq 0.05$$

$$0 \leq y \leq 0.02$$

$$0 \leq z \leq 0.005$$

$$0 \leq \phi \leq 0.12$$

$$0 \leq p \leq 0.12$$

$$0.0035 \leq \phi + p \leq 0.12$$

and $$1.000 \leq m \leq 1.006.$$

6. The capacitor for pulse generation according to claim 5, wherein the non-linear dielectric ceramic further comprises a Si oxide in an amount of 0.005–0.1 parts by weight with respect to 100 parts by weight of the polycrystalline substance.

7. The capacitor for pulse generation according to claim 5, wherein M comprises manganese oxide and an oxide of Ni or Co; R comprises an oxide of at least one element selected from the group consisting of La, Ce, Nd;

$$0.4 \leq b/a \leq 2.7$$

$$0.002 \leq a \leq 0.004$$

and $$0.002 \leq b \leq 0.004$$

$$0.32 < Ad \leq 0.93$$

$$0 \leq x \leq 0.04$$

$$0 \leq y \leq 0.01$$

$$0 \leq z \leq 0.004$$

$$0.01 \leq \phi \leq 0.1$$

$$0.01 \leq p \leq 0.09$$

$$0.004 \leq \phi + p \leq 0.1$$

$$1.000 \leq m \leq 1.005$$

and the amount of Si oxide is 0.01–0.09 parts by weight.

8. The capacitor of claim 5 disposed in a high-pressure metal vapor discharge lamp as a starter capacitor.

9. The capacitor of claim 6 disposed in a high-pressure metal vapor discharge lamp as a starter capacitor.

10. The capacitor of claim 7 disposed in a high-pressure metal vapor discharge lamp as a starter capacitor.

11. A dielectric ceramic which comprises a polycrystalline substance represented by the formula:

$(1-a-b)ABO_3 + aM + bR$ wherein $ABO_3$ is a barium titanate perovskite, M is an oxide of at least one element selected from the group consisting of Mn, Ni and Co, R is an oxide of at least one element selected from the group consisting of La, Ce, Nd, Pr, Sm, Eu, Gd, Tb, Dy, Ho, Er and Yb, and a and b represent mole fractions, $1.000 \leq A/B \leq 1.006$ (mole ratio)

$0.3 \leq b/a \leq 3$ $0.0015 \leq a \leq 0.0050$ and $0.0015 \leq b \leq 0.0050$ and the total content of M and R represented by Ad is $0.3 < Ad \leq 1.0$ (wt. %).

12. A dielectric ceramic according to claim 11, wherein $ABO_3$ is $\{(Ba_{1-x-y-z}Sr_xCa_yMg_z)O\}_m(Ti_{1-\phi-p}Zr_\phi Hf_p)O_2$, $0 \leq x \leq 0.05$ $0 \leq y \leq 0.02$ $0 \leq z \leq 0.005$ $0 \leq \phi \leq 0.12$ $0 \leq p \leq 0.12$ $0.0035 \leq \phi + p \leq 0.12$ and $1.000 \leq m \leq 1.006$.

13. A dielectric ceramic according to claim 11, which further comprises a Si oxide in an amount of about 0.005–0.1 parts by weight with respect to 100 parts by weight of the polycrystalline substance.

14. A dielectric ceramic according to claim 13, wherein $ABO_3$ is $\{(Ba_{1-x-y-z}Sr_xCa_yMg_z)O\}_m(Ti_{1-\phi-p}Zr_\phi Hf_p)O_2$, $0 \leq x \leq 0.05$ $0 \leq y \leq 0.02$ $0 \leq z \leq 0.005$ $0 \leq \phi \leq 0.12$ $0 \leq p \leq 0.12$ $0.0035 \leq \phi + p \leq 0.12$ and $1.000 \leq m \leq 1.006$.

15. A dielectric ceramic according to claim 14, wherein M comprises manganese oxide and an oxide of Ni or Co; R comprises an oxide of at least one element selected from the group consisting of La, Ce, Nd;

$0.4 \leq b/a \leq 2.7$ $0.002 \leq a \leq 0.004$ $0.002 \leq b \leq 0.004$ $0.32 < Ad \leq 0.93$ $0 \leq x \leq 0.04$ $0 \leq y \leq 0.01$ $0 \leq z \leq 0.004$ $0.01 \leq \phi \leq 0.1$ $0.01 \leq p \leq 0.09$ $0.004 \leq \phi + p \leq 0.1$ $1.000 \leq m \leq 1.005$ and the amount of Si oxide is 0.01–0.09 parts by weight.

* * * * *